(12) United States Patent
He et al.

(10) Patent No.: US 9,817,698 B2
(45) Date of Patent: Nov. 14, 2017

(54) SCHEDULING EXECUTION REQUESTS TO ALLOW PARTIAL RESULTS

(75) Inventors: Yuxiong He, Bellevue, WA (US); Sameh Elnikety, Redmond, WA (US); James R. Larus, Mercer Island, WA (US); Chenyu Yan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1275 days.

(21) Appl. No.: 13/163,399

(22) Filed: Jun. 17, 2011

(65) Prior Publication Data

US 2012/0324466 A1 Dec. 20, 2012

(51) Int. Cl.
*G06F 9/46* (2006.01)
*G06F 9/50* (2006.01)

(52) U.S. Cl.
CPC ........ *G06F 9/50* (2013.01); *G06F 2209/5013* (2013.01)

(58) Field of Classification Search
CPC .... G06F 9/5016; G06F 9/5022; G06F 9/5027; G06F 9/505; G06F 9/5011; G06F 9/50; G06F 2209/5013
See application file for complete search history.

(56) References Cited

U.S. PATENT DOCUMENTS

| | | | |
|---|---|---|---|
| 6,175,869 B1 | 1/2001 | Ahuja et al. | |
| 6,661,775 B1 * | 12/2003 | Nakayama et al. | 370/230.1 |
| 6,801,943 B1 * | 10/2004 | Pavan et al. | 709/226 |
| 7,594,003 B2 * | 9/2009 | Davidson | G06F 17/30902 709/219 |
| 7,664,833 B2 | 2/2010 | Shoolman et al. | |
| 7,720,954 B2 | 5/2010 | Raja et al. | |
| 7,958,509 B2 * | 6/2011 | Aridor et al. | 718/104 |
| 8,434,086 B2 * | 4/2013 | Dodge | G06F 9/4881 709/226 |
| 2001/0039575 A1 | 11/2001 | Freund et al. | |
| 2003/0050954 A1 * | 3/2003 | Tayyar et al. | 709/102 |
| 2003/0156547 A1 | 8/2003 | Peleg | |
| 2005/0207439 A1 | 9/2005 | Iyengar et al. | |
| 2006/0212873 A1 | 9/2006 | Takahisa | |
| 2008/0235699 A1 * | 9/2008 | Jeong et al. | 718/104 |
| 2010/0235512 A1 * | 9/2010 | Beser | 709/226 |
| 2011/0033037 A1 * | 2/2011 | Mazurenko et al. | 379/406.08 |
| 2012/0144389 A1 * | 6/2012 | Hicks et al. | 718/1 |

OTHER PUBLICATIONS

He et al., "Zeta: Scheduling Interactive Services with Partial Execution", Oct. 14-17, 2013, SOCC'12.*
Yuxiong He et al., "Zeta: Scheduling Interactive Services with Partial Execution", SOCC'12, Oct. 2012.*
J. Huang et al.. Criticality- and QoS-Based Multiresource Negotiation and Adaptation. RTS, 15:249-273, 1998.*

(Continued)

*Primary Examiner* — Lewis A Bullock, Jr.
*Assistant Examiner* — Kevin X Lu

(57) ABSTRACT

The subject disclosure is directed towards scheduling requests using quality values that are defined for partial responses to the requests. For each request in a queue, an associated processing time is determined using a system load and/or the quality values. The associated processing time is less than or equal to a service demand, which represents an amount of time to produce a complete response.

20 Claims, 8 Drawing Sheets

(56) References Cited

OTHER PUBLICATIONS

Tozer, et al., "Q-Cop: Avoiding Bad Query Mixes to Minimize Client Timeouts under Heavy Loads", Retrieved at www.comp.nus.edu.sg/~tayyc/6282/QueryMix.pdf>>, ICDE Conference, 2010, pp. 397-408.
Baek, et al., "Green: A Framework for Supporting Energy-conscious Programming using Controlled Approximation", Retrieved at <research.microsoft.com/en-us/um/people/trishulc/papers/green.pdf>>, PLDI '10, Toronto, Ontario, Canada, Jun. 5-10, 2010, pp. 12.
Bansal, et al., "Dynamic Speed Scaling to Manage Energy and Temperature", Retrieved at <<eeexplore.ieee.org/stamp/stamp.jsp?tp=&arnumber=1366272&userType=inst>>, Proceedings of the 45th Annual IEEE Symposium on Foundations of Computer Science (FOCS'04), 2004, pp. 10.
Bar-Noy, et al., "Bandwidth Allocation with Preemption", Retrieved at <citeseerx.ist.psu.edu/viewdoc/download?doi=10.1.1.13.8834&rep=rep1&type=pdf>>STOC, 1995, pp. 24.
Baruah, et al, "On the Competitiveness of On-line Real-time Task Scheduling", Retrieved at <ieeexplore.ieee.org/stamp/stamp.jsp?tp=&arnumber=160364>>, Real-Time Systems Symposium Proceedings Twelfth, 1991,pp. 106-115.
Chang, et al., "Competitive Online Scheduling with Level of Service", Retrieved at <www.comp.nus.edu.sg/~changec/publications/online.pdf>>, Computing and Combinatorics, 2001, pp. 20.
Chin, et al., "Online Scheduling with Partial Job Values: Does Timesharing or Randomization Help?", Retrieved at <hub.hku.hk/bitstream/10722/48425/1/85447.pdf>>, Algorithmica, Version 37, No. 3, 2003, pp. 149-164.
Chrobak, et al., "Preemptive Scheduling in Overloaded Systems", Retrieved at <<citeseerx.ist.psu.edu/viewdoc/download?doi=10.1.1.5.9611&rep=rep1&type=pdf>>, Journal of Computer and System Sciences, vol. 67, Feb. 7, 2003, pp. 18.
Huang, et al., "Optimal Control of Multiple Bit Rates for Streaming Media", Retrieved at <research.microsoft.com/pubs/75960/HuangCK04c.pdf>>, Picture Coding Symposium, 2004, pp. 4.
Kalyanasundaram, et al., "Speed is as Powerful as Clairvoyance", Retrieved at <ieeexplore.ieee.org/stamp/stamp.jsp?tp=&arnumber=492478, Foundations of Computer Science, Proceedings, 36th Annual Symposium on, Oct. 23-25, 1995, pp. 214-221.
Koo, et al., "Online Scheduling with Tight Deadlines", Retrieved at <citeseerx.ist.psu.edu/viewdoc/download?doi=10.1.1.12.2647&rep=rep1&type=pdf>>, Mathematical Foundations of Computer Science, 2001, pp. 10.
Koren, et al., "D-over: An Optimal On-line Scheduling Algorithm for Overloaded Uniprocessor Real-time Systems", Retrieved at <hal.inria.fr/docs/00/07/00/30/PDF/RT-0138.pdf>>, SIAM Journal on Computing, vol. 24, 1995, pp. 318-339.

Lam, et al. "Trade-offs Between Speed and Processor in Hard-deadline Scheduling", Retrieved at <citeseerx.ist.psu.edu/viewdoc/download?doi=10.1.1.51.1613&rep=rep1&type=pdf>>, SODA, 1999, pp. 10.
Li, et al. "Discrete and Continuous Min-energy Schedules for Variable Voltage Processors", Retrieved at <www.cs.cityu.edu.hk/~fyao/downloads/PNAS.pdf, National Academy of Sciences, vol. 103, 2006, pp. 3983-3987.
Liu, et al., "Opportunities and Challenges of Peer-to-peer Internet Video Broadcast", Retrieved at <ieeexplore.ieee.org/stamp/stamp.jsp?tp=&arnumber=4399973>>, Proceedings of the IEEE, vol. 96, 2008, pp. 11-24.
McCann, et al., "A Dynamic Processor Allocation Policy for Multiprogrammed Shared-Memory Multiprocessors", Retrieved at <stuff.mit.edu/afs/sipb/user/nathanw/work/sched/papers/p146-mccann.pdf>>, ACM Transactions on Computer Systems, vol. 11, No. 2, 1993, pp. 146-178.
Rejaie, et al., "Quality Adaptation for Congestion Controlled Video Playback over the Internet", Retrieved at <<citeseerx.ist.psu.edu/viewdoc/download?doi=10.1.1.83.4051&rep=rep1&type=pdf>>, SIGCOMM Computer Communication Review, vol. 29, 1999, pp. 189-200.
Sripanidkulchai, et al., "The Feasibility of Supporting Large-scale Live Streaming Applications with Dynamic Application Endpoints", Retrieved at <esm.cs.cmu.edu/technology/papers/Sigcomm.LargeScale.2004.pdf>>, SIGCOMM Comput. Commun. Rev., vol. 34, 2004, pp. 107-120.
Yao, et al., "A Scheduling Model for Reduced CPU Energy", Retrieved at <ieeexplore.ieee.org/stamp/stamp.jsp?tp=&arnumber=492493, FOCS, 1995, pp. 9.
Zilberstein, Shlomo, "Using Anytime Algorithms in Intelligent Systems", Retrieved at <www.aaai.org/ojs/index.php/aimagazine/article/download/1232/1133>>, AI Magazine, vol. 17, No. 3, 1996, pp. 73-83.
Bar-Noy, et al., "Sharing video on demand", Retrieved at <u.cs.biu.ac.il/~herzbea/Papers/distributed%20non-crypto/sharing-video-on-demand.pdf>>, vol. 129, pp. 3-30, 2003.
Chin, et al., "Improved competitive algorithms for online scheduling with partial job values", Retrieved at <ac.els-cdn.com/S0304397504004219/1-s2.0-S0304397504004219-main.pdf?_tid=9b1d85fc-dd17-11e2-9845-00000aacb362&acdnat=1372110603_5dd6c0a821b07370e7e89e04db575b4f>>, Computing and Combinatorics, 2003, pp. 12.
Garoflakis, et al, "Competitive on-line scheduling of continuous-media streams", Retrieved at <ac.els-cdn.com/S0022000001917994/1-s2.0-S0022000001917994-main.pdf?_tid=5608c200-dd18-11e2-b05f-00000aab0f6c&acdnat=1372110917_099d35c8f31a9d60bc9d0f1999452360>>, Journal of Computer and System Sciences, vol. 64, 2002, pp. 219-248.

\* cited by examiner

SCHEDULING EXECUTION REQUESTS TO ALLOW PARTIAL RESULTS

BACKGROUND

Internet resources often comprise interactive services, such as a search engine, a map service, online gaming and/or video-on-demand. Search engines receive queries from Internet users and return search results (e.g., a fixed number of top ranked documents that match each query) within a pre-defined deadline. In a video-on-demand environment, users access various multimedia, such as video clips (i.e., media streams). Because transmitting the video clips utilizes various computing resources to maintain a certain level of user experience, servers communicate high quality video clips streams within a requested deadline only when lightly or moderately loaded.

Such interactive services consume a significant portion of computing resources, such as processor cycles, network bandwidth, Input/Output (I/O), storage capacity and/or the like. Accordingly, the interactive services require a system of servers for processing requests, such as indexing servers for responding to queries for the search engine. Interactive service providers desire short, predictable response times for requests while reducing operational costs. To reduce cost, it is desirable to operate the servers at high resource utilization rather than using many lightly loaded servers handling the same load, which saves hardware, energy and maintenance costs. To achieve short and predictable response times, the interactive services keep average computing resource utilization low. As servers become busy, queuing delays increase and requests miss their deadlines, resulting in degradation in service quality. Such a degradation results in poor user experience and revenue loss. The resource utilization is kept low because the servers cannot support a good quality of service when the servers are overloaded or approaching an overload.

In contemporary systems, contemporary schedulers associated with the system for scheduling the requests do so in a way that provides a complete response, or rejects the request when a deadline cannot be satisfied, e.g., when the system is overloaded with requests. In this scheme, no response is provided if it cannot be completed by the deadline. As a result, the system is unable to deliver a high response quality and/or cannot consistently maintain a high resource utilization rate when heavily loaded.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which requests are scheduled for execution in a way that provides high response quality and a high resource utilization rate. Quality values are defined so as to provide for partially complete responses to requests when necessary during times of high load. To this end, associated processing times are assigned to the requests based upon load, which ensures that each request has an amount of processing time that is reduced when a current system load is too high or overloaded to effectuate an increase in overall response quality.

In one aspect, the requests are stored in a queue. The current system load (e.g., associated with the queue) is used to compute a total available processing time for the requests. The system resources are partitioned among the requests in a manner that improves overall response quality. In one aspect, the requests are extracted from the queue and executed according to various parameters that control execution.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
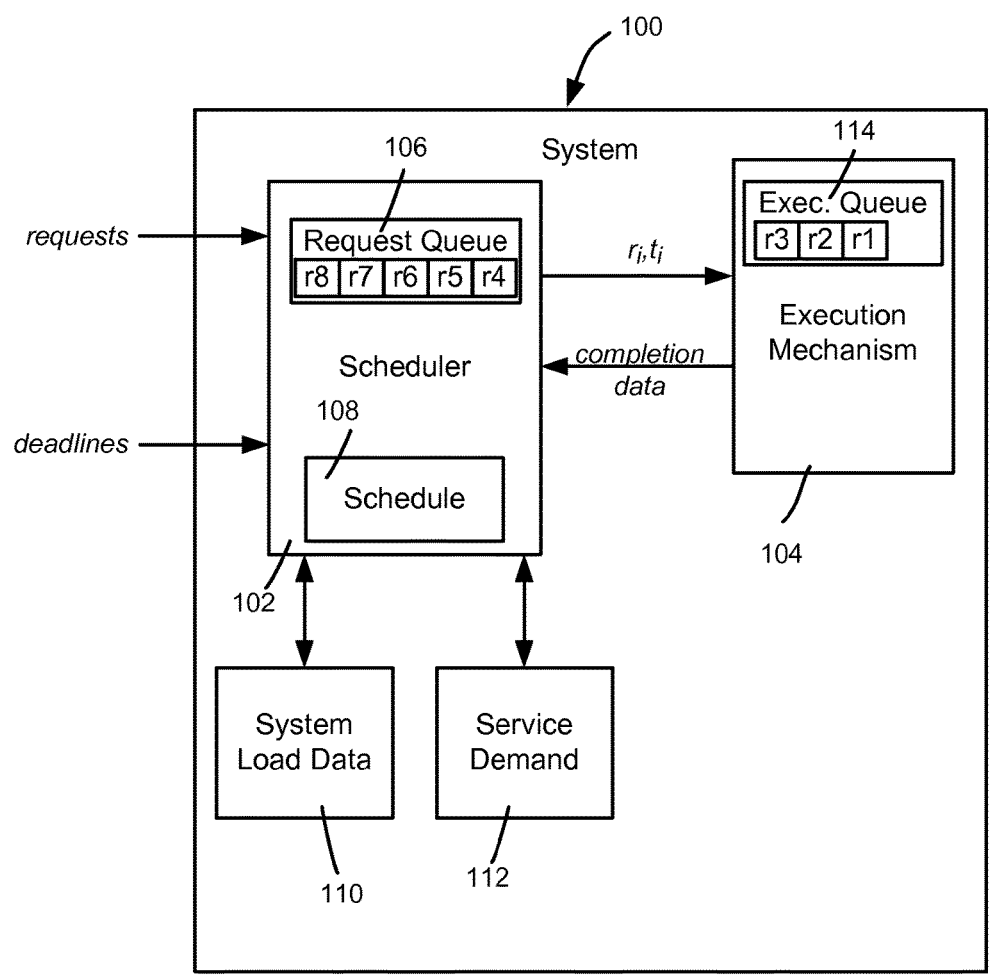
FIG. 1 is a block diagram illustrating an exemplary system for scheduling requests using quality values.

Various aspects of the technology described herein are generally directed towards scheduling requests using quality values that are defined for partially complete responses, in relation to a quality value for a complete response. Even though these quality values correspond to less than full quality responses, a system implementing such a quality value-based scheduler achieves an improvement in overall quality because the requests are executed to an extent rather than being rejected. In this way, some or all of the requests may be partially executed in order to produce partially complete responses, which are generally better than no responses.

By way of example, consider that because of load there is not enough time to fully process two requests, only one. Rather than rejecting one request (quality=0.0) and fully processing another (quality=1.0), which sums to an overall quality of 1.0, the two requests may be processed such that each has eighty percent (quality=0.8), which sums to an overall quality of 1.6. Hence, the overall quality improves when an appropriate amount of processing time is allocated for each of the requests.

In one implementation, the system may allocate an equal amount of processing time for each request. The allocation of the processing time, as used herein, refers to an amount of time to utilize one or more resources, such as a processor (CPU) time, network bandwidth, physical disk bandwidth or 10 operations, memory cache and/or the like. For example, a request is allocated an amount of resource units to upload data to a computer based on an available network bandwidth. The allocated resource units are sufficient to fully or partially complete the data upload. If the data includes a portion of a video clip, under high load the allocated resource units may result in dropping packets or uploading a lower quality video in order to ensure that subsequent requests are able to at least produce partial results of a certain quality.

As a more particular example, an exemplary system used herein includes a search engine, which responds to queries with matching search results. The search engine uses an index that is partitioned across a plurality of servers to identify web resources (e.g., web pages, documents, rich Internet content and/or the like) that match a particular query. The search engine also ranks the web resources and returns a certain number of top ranking web resources within a time period known as a request deadline. Because an amount of time allocated to processing the particular query needs to be sufficient for producing at least a portion of the top ranking web resources, the system described herein assigns a processing time that is less than or equal to the per-request service demand, which is the processing time required to produce the full response. Providing a partially complete yet on time response is generally desired over no results because a user can still use less than a full set of top ranking web resources. An example of a partially complete response includes returning the top ten results based upon 600 candidate pages (or web resources) instead of 1,000 candidate pages, because not all 1,000 pages were able to be located and/or ranked in time.

Hence, a partial set of search results is associated with a level of quality (i.e., a quality value) according to the above mentioned example. Because the processing time that is assigned to the particular query may determine how many of the web resources are identified and returned as ranked search results, the processing time generally corresponds with a specific quality value as described herein, particularly with respect to FIG. 2. The indexing system can maximize the overall quality for several queries by modifying the processing time for executing these queries, as also described herein.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data processing in general.

FIG. 1 is a block diagram illustrating an exemplary system 100 for scheduling requests using quality values. The system 100 (e.g., implemented in one server among many servers) may support various interactive services, such as search engines, video-on-demand systems and/or online gaming. The system 100 is configured to receive requests from Internet users and provide responses prior to deadlines. Generally, the requests utilize one or more computing resources for executing computer programs over various data (e.g., processor-executable instructions in form of requests or processes having threads of execution).

As depicted, the system 100 includes various example components, such as a scheduler 102 and an execution mechanism 104. The scheduler 102 implements various request scheduling techniques, generally in an attempt to maximize an overall response quality as described herein. Each request (e.g., depicted as a current request $r_i$) is communicated to the execution mechanism 104 along with an associated processing time $t_i$. Accordingly, the execution mechanism 104 commences execution of the current request $r_i$ and completes the processing (e.g., returns a query response) within the associated processing time $t_i$.

In one or more exemplary implementations, the scheduler 102 computes the associated processing time based on various information, such as a request queue 106 and/or a schedule 108. The queue 106 stores the requests according to arrival time. The schedule 108 is used to compute time data for the requests, such as based upon arrival times, service demands, deadline data, start times and/or end times. The scheduler 102 generally computes an amount of available processing time that is based on the deadline and stores such a time in system load 110.

For example, the available processing time may be less than or equal to a difference between a deadline of a last request within the queue 106 and a start time of a first request or, alternatively, a current time. The current time may be used if execution of the first request has not commenced. For example, by dividing the available processing time with a number of the requests within the queue 106, the scheduler 102 determines an average processing time per request, which is stored within system load 110.

The scheduler 102 compares the system load 110 with a service demand 112 in order to determine the associated processing time that is less than or equal to the service demand 112. In one or more exemplary implementations, the service demand 112 is an amount of processing time to produce a complete response for the current request. In other words, the service demand 112 corresponds with a full response quality as indicated by the quality values associated with the current request. The service demand 112 may be pre-defined and static or, alternatively, modified given completion times of previous requests. In an alternative implementation, the service demand 112 is an average expected processing time for the current request.

When the execution mechanism 104 receives a request and corresponding execution time, the execution mechanism 104 queues the request in its execution queue 114. The execution mechanism returns completion data (e.g., a request complete response or a notification) to the scheduler 102 when a request has been executed. The scheduler may use this information in determining the system load 110 and/or the service demand 112.

In one exemplary implementation, a video-on-demand (VOD) server, similar to the system 100, receives requests for continuous media (e.g., video files) from clients and streams the continuous media back to the clients. A VOD server manages many resources, such as network upstream bandwidth and physical disk I/O. Instead of declining requests for a new media stream, the scheduling mechanism 102 manages utilization of the network upstream bandwidth and the VOD server produces partial results when heavily loaded.

The scheduler 102 allocates available resource units to the requests. As described herein, the available processing time is between a time after executing a prior request in the request queue 106 and a playback deadline. The available processing time represents an amount of time for the VOD server to transmit at least a portion of the new media stream at or near a rate approaching an available network bandwidth. In one implementation, each request is allocated an amount of data from the new media stream to upload that is equal to or less than an amount of data that is capable of being communicated at the available network bandwidth.

Such data is encoded using quality adaptation in accordance with a quality profile where video quality increases or decreases due to an amount of data received from the VOD server before a playback deadline. As described further in FIG. 2, the scheduler 102 uses a quality function (e.g., an exponential quality function) to represent the video quality as a function of the received data ratio (i.e., actual data received normalized to the full service demand).

The request queue 106 includes a series of these requests for video quanta at certain sizes and deadlines. After assigning allotments of the available processing time, the scheduler 102 modifies such allotments because of the system load 110. If the system load 110 indicates a low load at the system 100, the VOD server uploads a complete media stream. If the system load 110 indicates a heavy load, the scheduling mechanism allocates less data to some of these requests if the current network bandwidth is insufficient.

In an alternate example, the system 100 implements a web server that sends complete or partial results to achieve a certain quality. If the system load 110 indicates a light load, the web server communicates complete web pages. If the system load 110 indicates a heavy load, the web server communicates webpages having lower quality images or text-only web pages. Similarly, the scheduler 102 partitions an available disk I/O bandwidth among a plurality of requests. Each request is allocated enough processing time to transfer a certain amount of data at or near the available disk I/O bandwidth. The scheduler 102 determines a quality and size of each steam read from or written to a physical disk.

Figure 2:
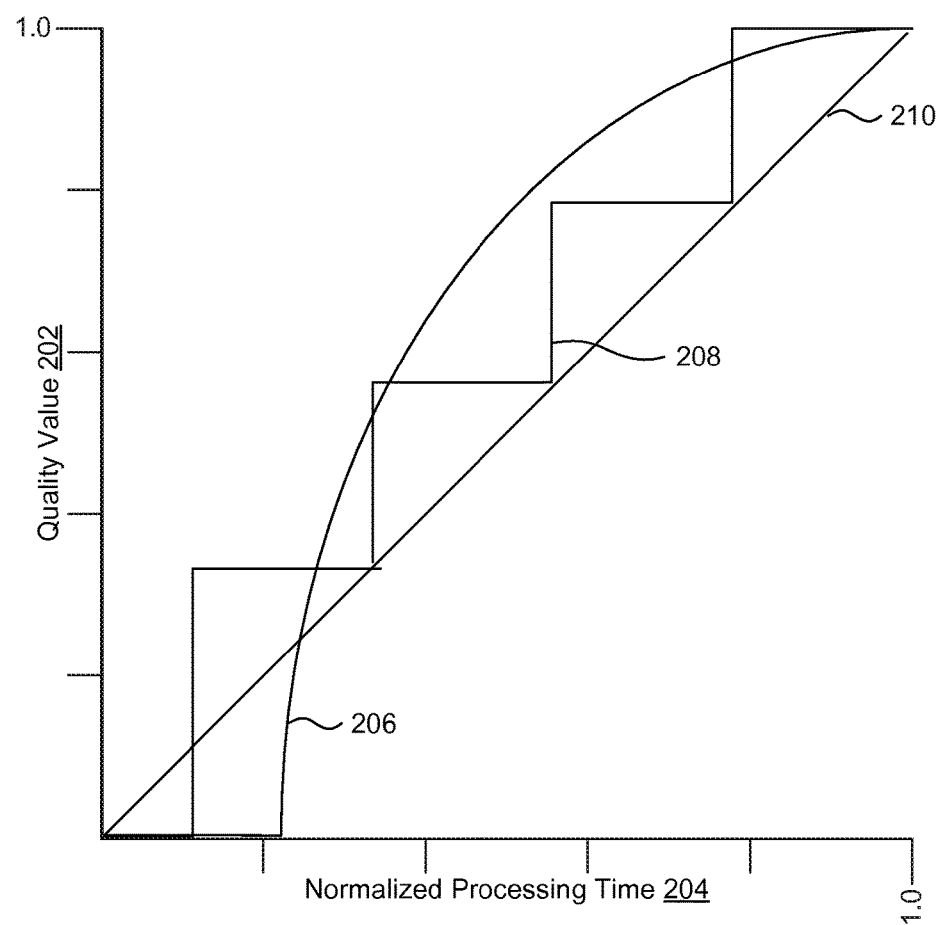
FIG. 2 is a graphical representation of exemplary quality values versus processing times.

FIG. 2 is an exemplary graphical representation 200 of quality values 202 versus normalized processing times 204. The quality values 202 and the normalized processing times 204 are arranged along a y-axis and an x-axis, respectively. Each interval of the normalized processing times 204 is a ratio between a potential processing time and a service demand for a particular request.

As depicted, various functions or distributions define exemplary quality values over all of the potential processing times. A quality function 206 forms a concave distribution where a change in processing time of any amount results in a change (e.g., an increase) in a quality value. Note that in general, the quality is non-linear, and has the property that quality increases rapidly once execution starts, and flattens out as execution continues. Thus, less than full execution tends to provide reasonably high-quality results, e.g., only half of the full execution time corresponds to seventy-to-eighty percent quality.

An exemplified quality function 208 forms a staircase distribution where a quality value of a response changes by 0.2 for every interval of 0.2 in normalized processing time. A quality function 210 forms a linear distribution in which a change in normalized processing time produces an equal change in quality value. In other words, an increase or decrease of any amount in the normalized processing times 204 results in an increase or decrease, respectively, of an equal amount in the quality values 202. It is appreciated that other exemplary quality functions may be used to determine associated processing times for requests according to alternative implementations. Nonetheless, the quality functions depicted in FIG. 2 define quality values for partially complete responses in which each quality value is less than or equal to a full (normalized) quality value of one (1.0).

Figure 3:
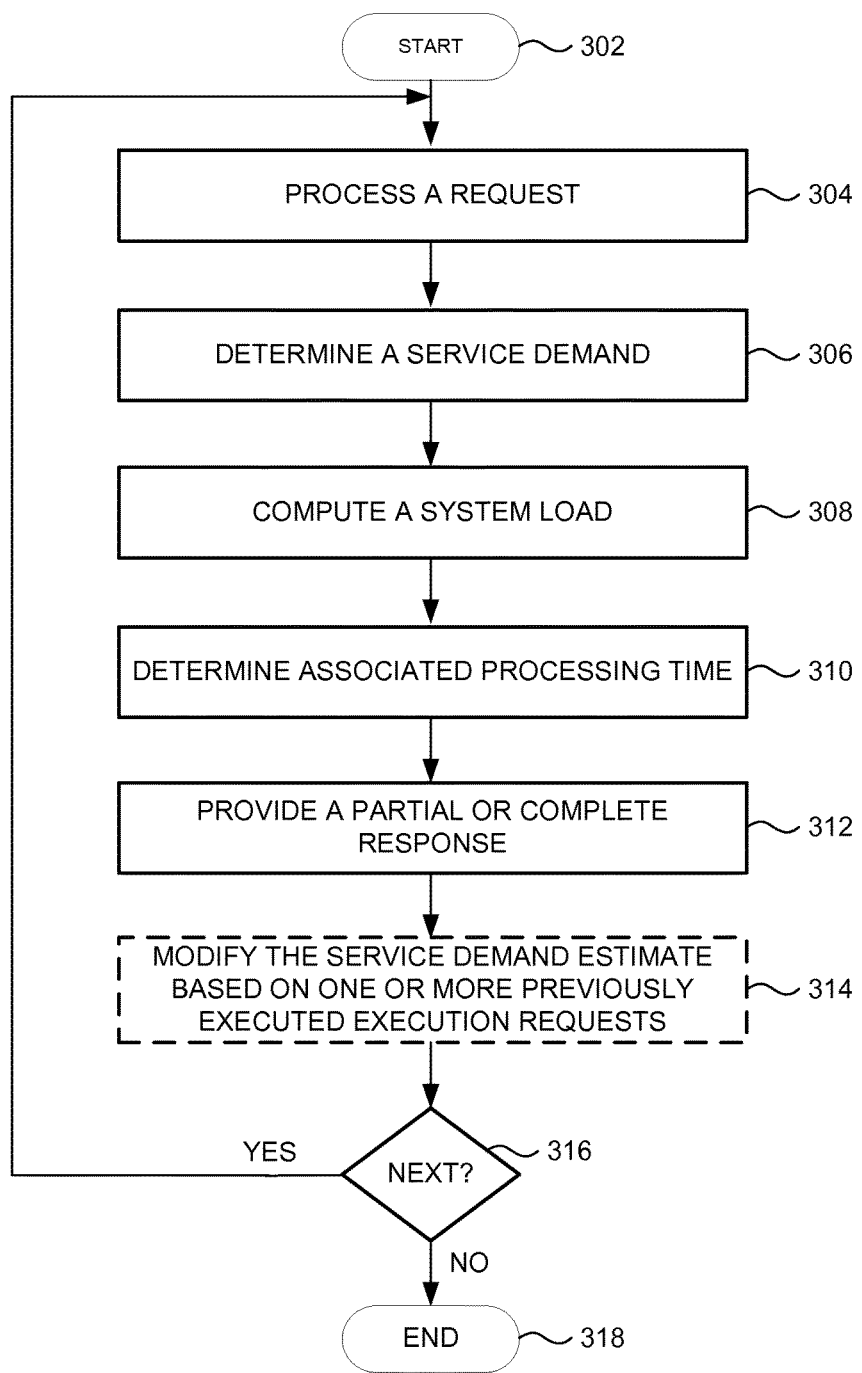
FIG. 3 is a flow diagram illustrating steps for scheduling requests using quality values according to one example implementation.

FIG. 3 is a flow diagram illustrating steps for scheduling requests using quality values according to one example implementation. Steps depicted in FIG. 3 commence at step 302 and proceed to step 304 when a request is processed at the scheduler 102. In one implementation of online scheduling, step 304 represents an arrival of the request and subsequent storage in the request queue. In one implementation of offline scheduling, step 304 represents an extraction of the request from the queue.

Step 306 is directed to determining a service demand for the request that is processed during step 304. The service demand may be predefined for the request according to one exemplary implementation. In an alternative implementation, the service demand is equal to a predicted service demand based on or more previously executed requests. After a response is generated for the request, an actual processing time is stored as a completion time in a schedule.

Step 308 is directed to computation of a system load. In one exemplary implementation, a current system load is computed using a summation of each service demand of one or more requests in an execution queue. requestrequestIn an alternative implementation, a predicted system load is computed based on one or more incoming executed requests in a request queue. The predicted system load, for example, is equal to a summation of one or more service demands of the one or more incoming requests. It is appreciated that in other implementations, the system load is computed using other alternative techniques.

Step 310 represents determination of an associated processing time for the request that is processed during step 304. In one exemplary implementation, the associated processing time is equal to the service demand because the current system load is less than an available amount of processing time. Hence, the current system load is sufficient for producing a complete response and achieving full quality.

In another exemplary implementation, the associated processing time is computed using the available amount of processing time and a queue length, which represents a number of arrived requests to be executed. By dividing the available amount of processing time by the queue length, the associated processing time is an average available processing time for each request in the queue. If the average available processing time is less than or equal to the service demand, then the associated processing time is equal to the average available processing time in order to ensure a sufficient amount of processing time for future requests and improve overall quality.

Figure 6:
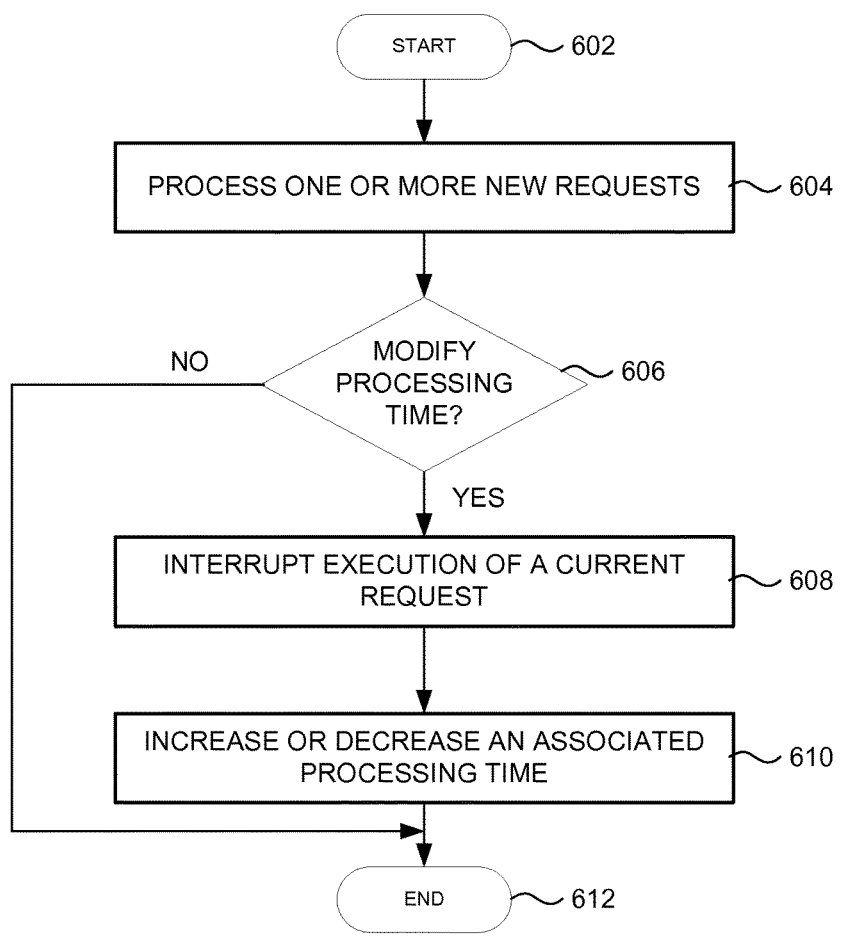
FIG. 6 is a flow diagram illustrating steps for executing one or more requests according to an alternate example implementation

In one exemplary implementation, step 310 includes computing the associated processing time based on a request type and/or a request source. If the request is initiated by a certain application, the associated processing time may be increased or decreased in view of a priority associated with the certain application. For example, high priority applications may be allocated more processing time because requests from these applications need to maintain a high response quality and user experience. As another example, requests for certain tasks (e.g., security related tasks) may be allocated additional processing time due to the nature of such tasks. FIG. 6 illustrates the effect on execution of a current request when the associated processing time is modified. Instead of interrupting the request, other requests may have their times shortened, and so on.

Step 312 represents execution mechanism's execution of the request that is processed during step 304 using the associated processing time that is determined during step 310. Based on the associated processing time, the execution mechanism provides a partial response or a complete response when executing the request. In one exemplary implementation, one or more parameters that are configured to control the execution may be selected based on the associated processing time as described with reference to FIG. 5. According to various implementations of pre-emptive solutions, the execution may be interrupted to comply with the associated processing time. In one exemplary implementation, the associated processing time may be decreased in order to preserve a sufficient amount of time for future requests. In another exemplary implementation, the associated processing time may be increased when the current system load is low in order to achieve a high or full quality for the response while maintaining enough time to satisfy later requests, such as one or more requests at an end of the queue.

Optional step 314 is directed to modifying the service demand based on or more previously executed requests. In one exemplary implementation, the service demand is decreased in response to one or more previous completion times that are shorter than the assigned processing times. The change in the service demand causes a change in an associated processing time of a next request. Optional step 314 is used to attempt to maximize an overall response quality by adapting the associated processing times to expected completion times.

Step 316 represents a decision as to whether to execute the next request. If there are more requests remaining in the queue, then steps 304-312 and/or optional step 314 are repeated for the next request. If there are no more requests, then step 318 represents a termination of the scheduling of the requests.

Figure 4:
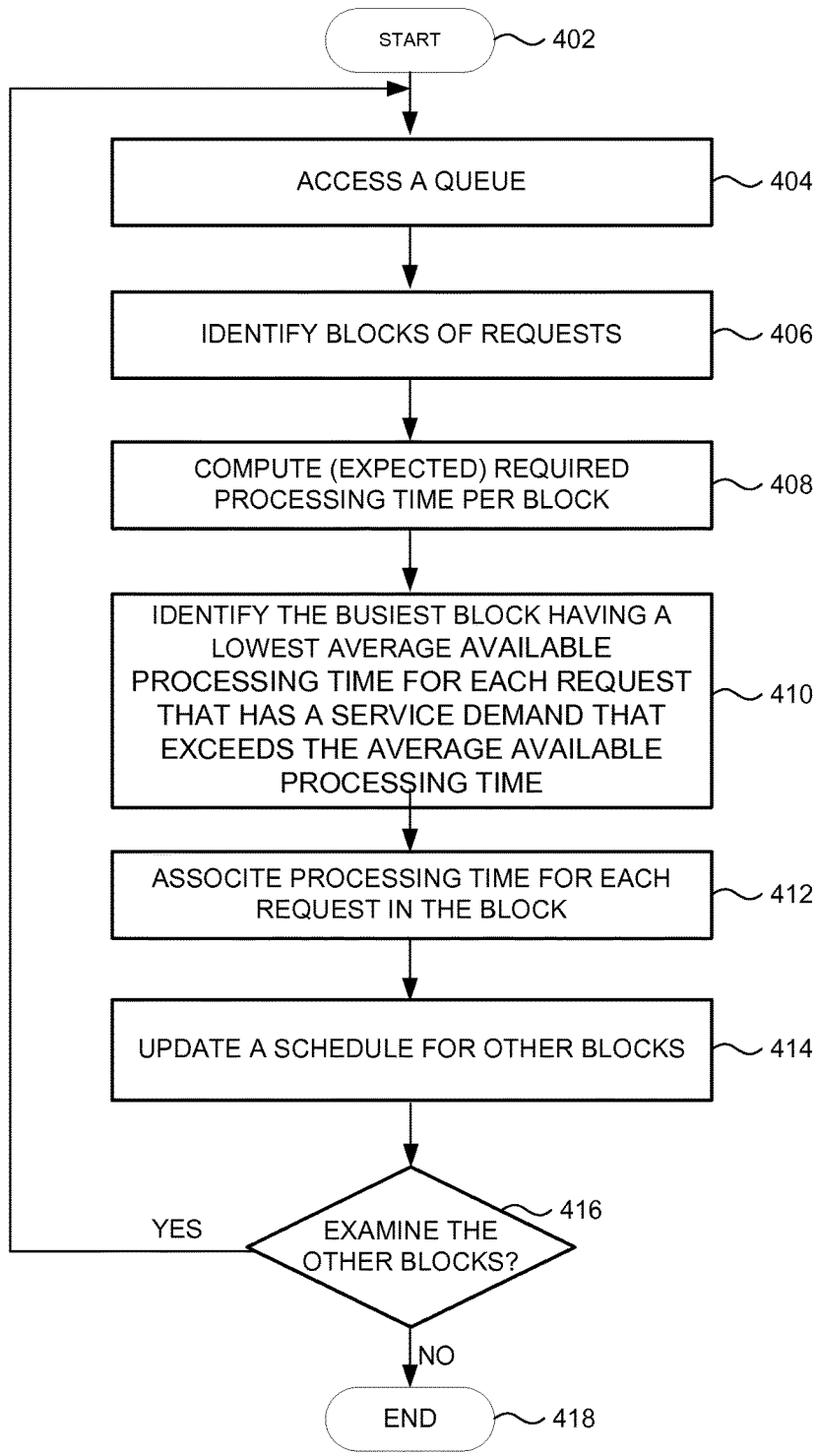
FIG. 4 is a flow diagram illustrating steps for scheduling requests using quality values according to an alternate example implementation.

FIG. 4 is a flow diagram illustrating steps for scheduling requests using quality values according to an alternate example implementation. Methods depicted by the FIG. 4 commence at step 402 and proceed to step 404 when a queue comprising requests is accessed. Step 404 to step 418 can be performed by an exemplary system (e.g., the system 100 of FIG. 1) implementing scheduling techniques for requests while offline (e.g., not currently receiving requests) or online (e.g., currently receiving requests) according to various exemplary implementations.

When the exemplary system is offline, certain information regarding future requests and/or active requests becomes available that would be absent if the exemplary system is online, such as actual (i.e., pre-defined) service demands, arrival times and/or the like. The scheduler may comprise a function implementing a scheduling technique that can be used for offline scheduling. The scheduler also may be combined with functions that approximate the absent information for online scheduling, such as ClairvoyantOnlineScheduler and NonClairvoyantOnlineScheduler. ClairvoyantOnlineScheduler is a function that is used to determine the associated processing time in response to one or more newly arrived requests when their service demand is known. NonClairvoyantOnlineScheduler is a function that is used to determine the associated processing time in response to one or more newly arrived requests when their service demand is unknown.

While the description below refers a particular scheduling model, which is depicted according to Table 1 as follows, other scheduling models may be employed in other implementations:

TABLE 1

(Scheduling Model)

| | |
|---|---|
| Queue of requests | J |
| quality function | F |
| arrival time | $r_k$ |
| service demand (i.e., work) | $w_k$ |
| completion time | $c_k$ |
| num of requests in queue | n |
| Deadline | $d_k$ |
| start time | $s_k$ |
| associated processing time | $p_k$ |

A queue comprises one or more blocks in which each comprises one or more requests. The queue may be partitioned into the one or more blocks according to various techniques. Step 406 represents processing of the one or more blocks that form the queue. Step 408 is directed to computing an average available processing time per block, which is denoted as p(J[i,j]) for a block J[l,j] that includes each and every request between an $i^{th}$ location and a $j^{th}$ location in the queue J. In one or more exemplary implementations, the average available processing time is computed according to a following exemplary equation:

$$p(J[i,\ j]) = \frac{d_j - r_i - \sum_{J \in M(J[i,j])} w_k}{|U(j[i,\ j])|}$$

In accordance with the above mentioned scheduling model, M(J [i, j]) and U(J[i, j]) denote a set of marked requests and the set of unmarked requests in block J[i, j], respectively. A request is marked if its service demand is less than or equal to the average available processing time p(J[i,j]). If all requests are marked, there is a sufficient amount of available processing time to satisfy a system load while producing a complete response for all requests.

Step 410 is directed to identifying the busiest block having a lowest average available processing time for each request having a service demand that exceeds the average available processing time. A term p_smallest denotes the lowest average available processing time and is determined using a function labeled FindBusiestUnmarkedBlock( ), which is described below.

```
FindBusiestUnmarkedBlock
Require: start, end
Ensure: The busiest unmarked block.
 1: numMarked = 0
 2: while (numMarked < end − start+ 1) do
 3:   // find block with smallest average available processing time p(J).
 4:   p_smallest = ∞, i = j = start
 5:   for k = start : end do
 6:     for s = k : end do
 7:       compute p(J [k, s]) for block J[k, s].
 8:       if p(J[k, s]) < p_smallest then
 9:         p_smallest = p(J[k, s])
10:         i = k, j = s
11:   // mark requests whose service demand is less than p_smallest
11:   marked = false
12:   for each unmarked request $J_k$ ∈ J [start, end] do
13:     if $w_k$ ≤ p_smallest then
14:       marked = true and mark request $J_k$
15:       numMarked++
16:   if (!marked) then
17:     return (true, i, j, p_smallest)
18: return (false, 0, 0, 0)
```

Once the busiest unmarked block is identified, an associated processing time can be determined. Step 412 to step 416 are performed according to a scheduler technique as described further below. Step 412 is directed to partitioning the block equally such that each block is assigned a processing time p that is equal to the lowest average available processing time p_smallest.

Step 414 is directed to updating a schedule for other blocks in the queue, which include blocks located before and after the busiest unmarked block that is partitioned at step 412. Deadlines for requests before the busiest unmarked block are set to an arrival time of a first request in the busiest unmarked block. Arrival times for requests after the busiest unmarked block are set to a deadline of a last request in the busiest unmarked block. Step 414 ensures that requests in the other blocks are executed according to the schedule.

Step 416 represents a decision as to whether to examine the other blocks. According to one exemplary implementation, the scheduler function recursively schedules requests for the other blocks. As described in the following software code, requests for the blocks before the busiest unmarked block are scheduled prior to scheduling requests for the blocks after the busiest unmarked block. Step 418 represents a termination of the scheduling technique if there are no more blocks within the queue.

```
Scheduler ( )
Require: start, end
Ensure: start time s_k and complete time c_k for each request J_k, where k ∈
[start, end].
 1: if end < start then
 2:   return
 3: (found, i, j, p) = FindBusiestUnmarkedBlock(start, end)
 4: if (!found) then
 5: // all requests are marked and can be satisfied.
 6:   for k = start : end do
 7:     s_k = max{r_k, c_{k-1}}
 8:     c_k = s_k + w_k
 9:   return
10: else
11: // schedule requests in busiest unmarked block by equal partitioning
12:   for k = i : j do
13:     s_k = max{r_k, c_k-1}
14:     c_k = s_k +min{w_k, p}
15: // update other requests' arrival time or deadline
16:   for (start ≤ k ≤ i − 1 and d_k > r_i) do
17:     d_k = r_i
18:   for (j + 1 ≤ k ≤ end and r_k < d_j) do
19:     r_k = d_j
20:   Scheduler (start, i − 1)
21:   Scheduler (j + 1, end)
```

It is appreciated that while FIG. 4 refers to an equal partition policy as implemented in lines 11 to 14 of the scheduler function, other exemplary implementations may use different partitioning policies when assigning associated processing times. In one alternative implementation, step 412 represents the computation of the associated processing time that preserves available processing time for one or more requests at an end of the queue, such as a reservation policy. In one alternative implementation, lines 1 to 9 described below can be used to replace lines 11 to 14 of the scheduler function in order to select between the equal partitioning policy and the reservation policy.

```
1: lastExecutionRequest = queue[queue.size( ) − 1]
2: queueLen = queue.size( )
3: if (activeExecutionRequest/= null)
4:   then timeBase = activeExecutionRequest_{startProcessingTime}
5: else timeBase = curtime
6: timeAvail = lastExecutionRequest_{deadline} − timeBase
// equi-partitioning policy
7: EQ = timeAvail/queueLen
// reservation policy
8: RS = timeAvail/(queueLen−1) ×meanExecutionServiceRate
9: queue[0]_{processingTime} = max(EQ,RS)
```

Instead of using an actual service demand, a moving average of associated processing times that were expected for one or more previously executed requests. In one alternative implementation for online scheduling, the moving average labeled mean ExecutionServiceRate is computed recursively using a processing time $p_i$ of a last executed request and a constant multiplier $\alpha$ as follows:

$$meanServiceDemand = (1-\alpha) \times meanExecutionServieRate + \alpha \times p_i$$

In an exemplary implementation for online scheduling techniques, step 404 represents accessing the queue that comprises only requests that have arrived at the exemplary system as opposed to offline schedulers that access the queue comprising future requests as well. Such an implementation is depicted further below as a function ClairvoyantOnlineScheduler( ). If the queue includes an active request of which execution commenced, a start time is used to adjust an arrival time of each and every arrived request. Otherwise, the arrival times of the arrived requests set to a current time stamp. These arrival times are adjusted in order to ensure that the schedule function assigns processing times based on a current time.

```
ClairvoyantOnlineScheduler ( )
Require: active denotes the current running request; queue includes arrived
requests (including active request at queue[0] if active is not null); curtime
represents current time stamp;
1: time Base = (active == null)? curtime : s_{active}
2: for (k ∈ queue && r_k < timeBase) do
3:   r_k = timeBase
4: Scheduler (queue)
5: p_{queue[0]} = c_{queue[0]} − timeBase
6: return queue[0]
```

Furthermore, the associated processing time for the active request in the queue may be modified based on newly arrived requests. After partitioning the queue equally, the scheduler function sets the associated processing time to be equal to a lowest average available processing time for a block comprising the active request. If the associated processing time exceeds a deadline, terminate the active request. On the other hand, the execution of the request is stopped and a partially complete response is generated.

In alternative implementations of online scheduling techniques where a service demand of the current request is unknown, step 404 uses an average processing time of one or more previously executed requests. The average processing time may refer to an average assigned processing times. An exemplary alternative implementation is described as follows:

```
NonClairvoyantOnlineScheduler
1: for (k ∈ queue && k != queue[0]) do
2:   w_k = average service demand of previously executed requests
3:   w_{queue[0]} = span_{queue[0]}
4: return ClairvoyantOnlineScheduler (queue, active, curtime)
```

NonClairvoyantOnlineScheduler uses an average service demand instead of an actual service demand for each request except the current request, which includes an active request or an incoming active request. NonClairvoyantOnlineScheduler stores a service demand that is equal a total span of the queue rather than the average service demand, which results in numerous advantages. When the exemplary system is lightly loaded, using the average service demand results in a lower demand because more processing time could have been allocated. If the current request has an actual service demand larger than the average service demand, additional processing time is needed. By assuming that the active request is large, NonClairvoyantOnlineScheduler prevents degradation in quality caused by an insufficient amount of processing time.

Figure 5:
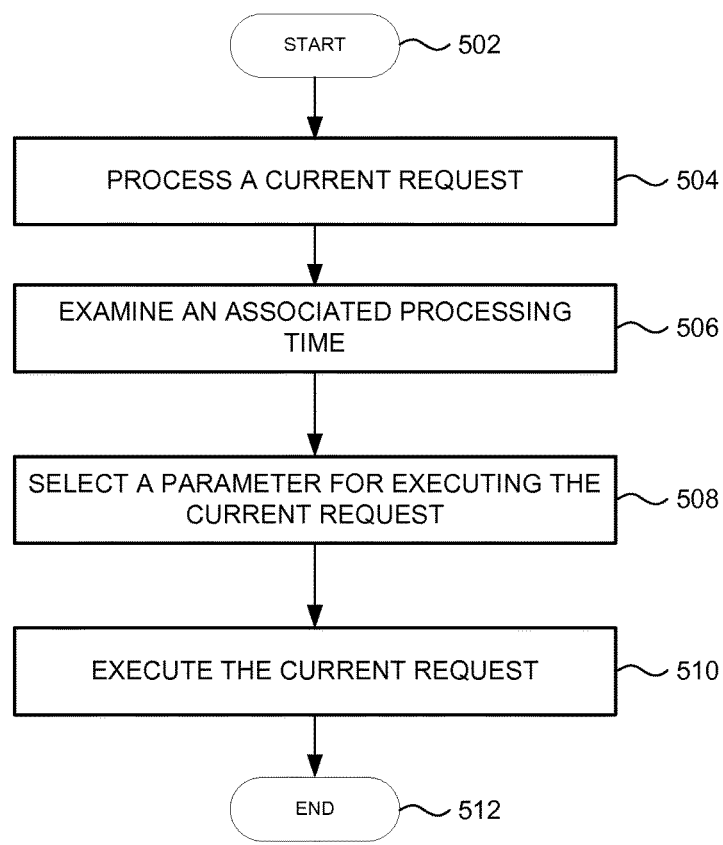
FIG. 5 is a flow diagram illustrating steps for executing one or more requests according to one example implementation.

FIG. 5 is a flow diagram illustrating steps for executing one or more requests according to one example implementation. Example steps depicted in FIG. 5 commence at step 502 and proceed to step 504 when a current request is processed. Steps 504 to 510 can be performed by an exemplary system (e.g., the system 100 of FIG. 1) implementing an execution mechanism (e.g., the execution mechanism 104 of FIG. 1). FIG. 5 represents an implementation of step 312 of FIG. 3.

Step 504 refers to processing a current (i.e., active) request from a queue. Step 506 represents an examination of an associated processing time for the current request. There are numerous techniques for executing the current request. For example, when a response is computed iteratively by searching the solution space or refined step-by-step, controlling a number of iterations produce partial results. Step 508 represents a selection of various parameters for achieving the associated processing time. These parameters may specify an appropriate technique, file, dataset and/or the like. In one exemplary implementation, a particular search technique (e.g., anytime A* search) can use the associated processing time to select an appropriate tradeoff between processing time versus response quality. Step 510 is directed to the execution of the current request using the selected parameters. Step 512 represents a termination of the execution of the current request after the associated processing time elapses.

FIG. 6 is a flow diagram illustrating steps for executing one or more requests according to an alternate example implementation. Methods depicted by the FIG. 6 commence at step 602 and proceed to step 604 when one or more newly arrived requests are processed and then stored in a queue. Step 604 to step 612 can be performed by an exemplary system (e.g., the system 100 of FIG. 1) implementing an execution mechanism (e.g., the execution mechanism 104 of FIG. 1). FIG. 6 represents an implementation of step 312 of FIG. 3 where a current request may be pre-empted.

Step 606 represents a decision as to whether to modify an associated processing time of a current request. In one exemplary implementation, the one or more newly arrived requests cause an increase a current system load and a subsequent decrease in an average available processing time. Accordingly, an amount of available processing time is reserved in order to achieve a high quality for the newly arrived requests that are located an end of the queue. Because the current request is being executed as the one or more newly arrived requests are received, a response for the current request is produced earlier.

Step 608 is directed to interrupting execution of the current requests. Step 610 is directed to increasing or decreasing an associated processing time of the current request. Step 612 represents a termination of the execution of the current request in view of the associated processing time that was modified during step 610.

Figure 7:
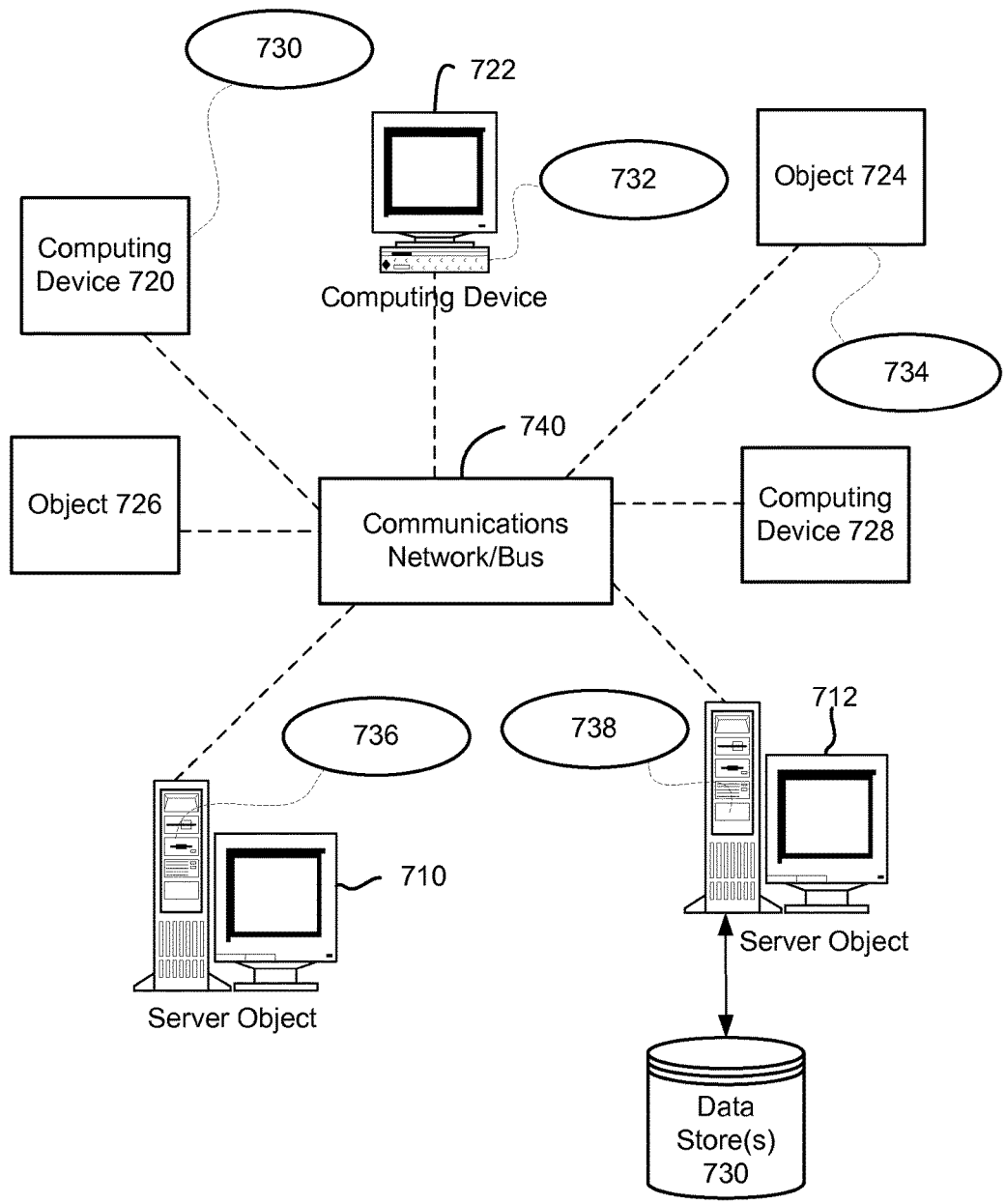
FIG. 7 is a block diagram representing exemplary non-limiting networked environments in which various embodiments described herein can be implemented.

FIG. 7 provides a schematic diagram of an exemplary networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
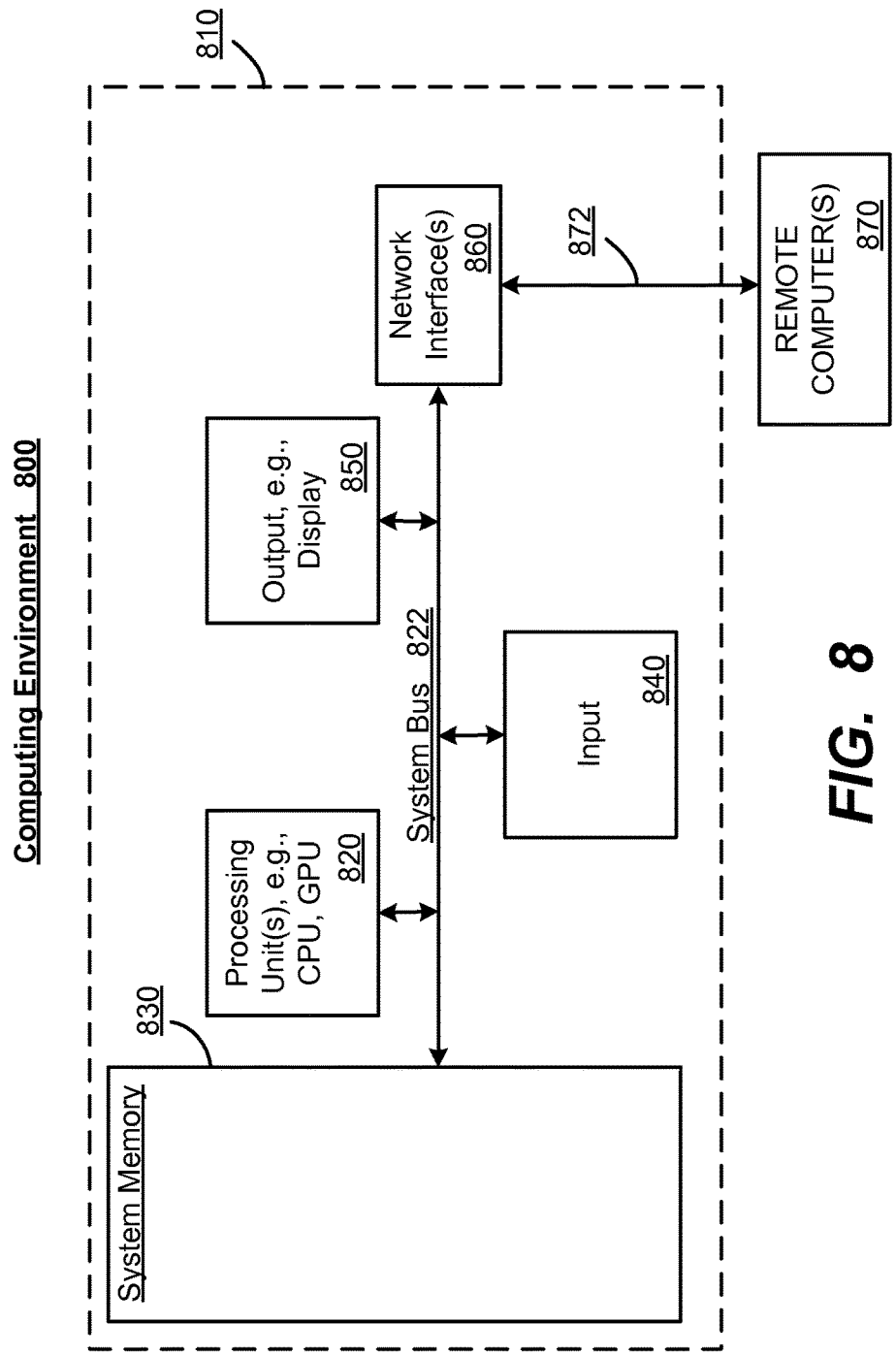
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for scheduling a processor request performed at least in part on at least one computing resource, the method comprising:
    retrieving the processor request from a queue of processor requests;
    determining a service demand for the processor request prior to the processor request being processed, the service demand based on a resource requirement of the processor request;
    computing a system load based on a plurality of service demands;
    determining an associated processing time for the processor request based upon the system load and an amount of available processing time; and
    determining an associated quality parameter for the processor request, such that an aggregate quality parameter associated with the computing environment is increased, the aggregate quality parameter including at least the associated quality parameter, the associated quality parameter having a non-linear relationship with the associated processing time;
    determining whether the system load is at or above a predetermined threshold;
    upon determining that the system load is at or above the predetermined threshold, modifying the determined associated processing time based on a request type or a source of the processor request to preserve time for executing at least one other request, based on the at least one other request's service demand, at an end of the queue of requests including the processor request for which the determined associated processing time has been modified;
    executing the processor request with the modified associated processing time; and
    providing a partial response upon the modified associated processing time being less than the service demand or a complete response upon the modified associated processing time being equal to the service demand.

2. The method of claim 1, wherein determining the associated processing time is further based upon a number of requests being processed, a length of the queue comprising the at least one other request or at least one deadline associated with the at least one other request, and determining the associated quality parameter is based upon an exponential quality function that is representative of a quality for the processor request as a function of an amount of data transmitted.

3. The method of claim 1 further comprising determining the aggregate quantity parameter associated with the computing environment, wherein determining the associated processing time is further based upon one or more associated quality parameters that are defined for partial responses associated with the processor request, wherein the one or more associated quality parameters includes the associated quality parameter, and a difference between the one or more quality parameters is associated with a change in the associated processing time for the processor request.

4. The method of claim 1 further comprising processing a plurality of other requests, including determining a second associated processing time for a second request based upon the system load, wherein the second associated processing time is equal to the associated processing time.

5. The method of claim 1, wherein determining the associated processing time comprises modifying the service demand based on one or more previously executed requests.

6. The method of claim 1, wherein determining the associated processing time further comprises computing the associated processing time that is less than a first deadline associated with the processor request, and modifying a second associated processing time for a second request based upon the system load, such that the second associated processing time is less than a second deadline associated with the second request.

7. The method of claim 1 further comprising executing at least one request based on at least one associated processing time.

8. The method of claim 7, wherein executing at least one request comprises selecting a parameter based on an associated processing time that controls the execution of a current request of the at least one request.

9. The method of claim 7, wherein executing at least one request comprises interrupting the execution of a current request, including modifying an associated processing time for the current request.

10. The method of claim 1, wherein determining the associated processing time comprises decreasing the associated quality parameter such that the aggregate quality parameter associated with the computing environment is increased.

11. The method of claim 1, wherein determining the associated processing time comprises determining that the service demand is equal to an average service demand of one or more previously executed requests.

12. The method of claim 1 further comprising:
determining whether the computing environment is online;
upon determining that the computing environment is online, implementing a first scheduling technique; and
upon determining that the computing environment is not online, implementing a second scheduling technique.

13. The method of claim 1 wherein the service demand is either predefined or equal to a predicted service demand based on previously executed requests.

14. In a computing environment, a system, comprising:
a memory storing computer executable instructions;
a processor which, when executing the computer executable instructions, is caused to:
retrieve a processor request from a queue of processor requests;
determine a service demand for a processor request prior to the processor request being processed, the service demand based on a resource requirement of the processor request;
compute a system load based on a plurality of service demands;
determine an associated processing time for the processor request using the system load and an amount of available processing time;
determine an associated quality parameter for the processor request such that an aggregate quality parameter associated with the computing environment is increased, the aggregate quality parameter including at least the associated quality parameter, the associated quality parameter having a non-linear relationship with the associated processing time; and
determine whether the system load is at or above a predetermined threshold, and, upon determining that the system load is at or above the predetermined threshold, modify the determined associated processing time based on a request type or a source of the processor request to preserve time for executing at least one other request, based on the at least one other request's service demand, at an end of a queue of requests including the processor request for which the determined associated processing time has been modified; and an execution mechanism for executing the processor request with the modified associated processing time partially upon the modified associated processing time being less than the service demand or completely upon the modified associated processing time being equal to the service demand.

15. The system of claim 14, wherein the execution mechanism selects a parameter based on an associated processing time that controls the execution of a current request of the at least one request.

16. The system of claim 14, wherein the execution mechanism interrupts the execution of a current request, including modifying an associated processing time for the current request.

17. The system of claim 14, wherein associated processing times of each processor request of the queue of processor requests are equal in amount.

18. One or more computing devices comprising:
one or more processing units;
a system memory comprising computer-executable instructions, which, upon execution by the one or more processing units, enable the one or more computing devices to perform operations comprising:
retrieving a processor request from a queue of processor requests;
determining a service demand for the processor request prior to the processor request being processed, the service demand based on a resource requirement of the processor request;
computing a system load based on a plurality of service demands;
determining an associated processing time for the processor request based upon the system load and an amount of available processing time, determining an associated quality parameter for the processor request such that an aggregate quality value associated with the one or more computing devices is increased, the aggregate quality parameter including at least the associated quality parameter, the associated quality parameter having a non-linear relationship with the associated processing time;
determining whether a predicted system load is at or above a predetermined threshold;
upon determining that the predicted system load is at or above the predetermined threshold, modifying the associated processing time based on a request type or a source of the processor request to preserve time for executing at least one other request, based on the at least one other request's service demand, at an end of the queue of requests including the processor request for which the determined associated processing time has been modified;
executing the processor request with the modified associated processor time; and
providing a partial response upon the modified associated processing time being less than the service demand or a complete response upon the modified associated processing time being equal to the service demand.

19. The one or more computing devices of claim 18, wherein the system memory comprises computer-executable instructions, which, upon execution by the one or more processing units, enable the one or more computing devices to perform operations comprising:
modifying the service demand based on one or more previously executed requests.

20. The one or more computing devices of claim 18, wherein the system memory comprises computer-executable instructions, which, upon execution by the one or more processing units, enable the one or more computing devices to perform operations comprising:

partitioning available resource units among requests using the associated processing times that are equal or proportional to request service demands.

* * * * *